US011777754B1

(12) United States Patent
Zhang et al.

(10) Patent No.: US 11,777,754 B1
(45) Date of Patent: Oct. 3, 2023

(54) MULTI-PERSON TRACKING AND IDENTIFICATION FOR ROBUST FRAMING EXPERIENCE (71) Applicant: PLANTRONICS, INC., Santa Cruz, CA (US)

(72) Inventors: Kui Zhang, Austin, TX (US); Raghavendra Balavalikar Krishnamurthy, Austin, TX (US); Rajen Bhatt, Pittsburgh, PA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 18/049,190

(22) Filed: Oct. 24, 2022

(51) Int. Cl.
*H04L 12/18* (2006.01)
*G06T 7/246* (2017.01)
*G06V 40/16* (2022.01)
*G06V 20/40* (2022.01)
*G06V 10/25* (2022.01)

(52) U.S. Cl.
CPC .......... *H04L 12/1822* (2013.01); *G06T 7/248* (2017.01); *G06V 10/25* (2022.01); *G06V 20/46* (2022.01); *G06V 40/167* (2022.01); *G06V 40/172* (2022.01); *G06T 2207/30201* (2013.01)

(58) Field of Classification Search
None
See application file for complete search history.

(56) References Cited

U.S. PATENT DOCUMENTS

| 2016/0261911 A1* | 9/2016 | Soundararajan ............................ H04N 21/44008 |
| 2018/0107880 A1* | 4/2018 | Danielsson .......... G08B 13/194 |
| 2021/0398128 A1* | 12/2021 | Huber, Jr. ............ G06Q 20/322 |

OTHER PUBLICATIONS

Bewley, Alex, et al., "Simple Online and Realtime Tracking", Queensland University of Technology, Jul. 7, 2017, pp. 1-5. Retrieved from the Internet: URL: https://arxiv.org/abs/1602.00763.
Cao, Jinkun, et al., "Observation-Centric SORT: Rethinking SORT for Robust Multi-Object Tracking", Computer Vision and Pattern Recognition (cs.CV), arXiv:2203.14360, Mar. 27, 2022, pp. 1-19. Retrieved from the Internet: URL: https://doi.org/10.48550/arXiv.2203.14360.

(Continued)

*Primary Examiner* — Angela Nguyen
(74) *Attorney, Agent, or Firm* — QUARLES & BRADY LLP (57) ABSTRACT

The number of persons in a still image acquired during a videoconference may change over time due to movement or persons entering or exiting a conference room. Minimizing the number of person identifiers that are tracked is beneficial for framing purposes. Typically, a stream of frames is sent to a far side, such as another endpoint device, for viewing. If the number of persons identified keeps changing, the composition of the stream of frames will be constantly changing as well. By using person identification and the use of timers, movement by the same person or a temporary change in a number or set of persons may be detected without making changes to the number of identifiers and persons being framed. It is only when a change has persisted past a period of time that changes are made to the frames, thereby improving the overall viewing experience.

20 Claims, 9 Drawing Sheets

(56) References Cited

OTHER PUBLICATIONS

Henriques, Joao F., et al., "High-Speed Tracking with Kernelized Correlation Filters", IEEE Transactions on Pattern Analysis and Machine Intelligence, Nov. 5, 2014, Retrieved from the Internet: URL: pp. 1-14. https://arxiv.org/abs/1404.7584?context=cs.

Wei, Wenyu, et al., "Person re-identification based on deep learning—An overview", Journal of Visual Communication and Image Representation, vol. 82, 2022, ISSN 1047-3203, pp. 1-16, Retrieved from the Internet: URL: https://www.sciencedirect.com/science/article/pii/S1047320321002765.

Zhang, Yifu, et al., "Byte Track: Multi-Object Tracking by Associating Every Detection Box", Huazhong University of Science and Technology, Apr. 7, 2022, pp. 1-14, Retrieved from the Internet: URL: https://doi.org/10.48550/arXiv.2110.06864.

\* cited by examiner

MULTI-PERSON TRACKING AND IDENTIFICATION FOR ROBUST FRAMING EXPERIENCE

BACKGROUND

An endpoint device acquires images of a conference room depicting persons participating in a videoconference.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During a videoconference, persons depicted in still images, acquired by cameras in a conference room, are identified for framing and tracking purposes. A conference room may include multiple cameras that are located at different locations in the conference room, each with a different field-of-view. One or more of these cameras may acquire the still images to determine the number of persons depicted in the conference room at any given time. However, the number of persons depicted in the still images may change over time due to movement or persons entering or exiting the conference room. If the number of persons keeps changing, a stream of frames corresponding to the different persons will be constantly changing as well. By using person identification and the use of timers, movement by the same person or a temporary change in a number or set of persons may be detected without making changes to the number of identifiers and persons being framed, thereby improving the overall viewing experience.

An endpoint device acquires images and audio data during the videoconference using a combination of cameras and microphones. For example, one or more cameras may be located within a conference room and coupled to the endpoint device to acquire images of the persons in a conference room from different sides, angles, and so on. The images acquired by the cameras may depict persons sitting in a conference room, moving locations within the conference room, entering the conference room, or exiting the conference room.

Once an image has been acquired, the image is analyzed to detect and uniquely identify the persons depicted therein. For example, bounding boxes may be associated with heads, faces, or bodies of the persons depicted within an image. Each person is identified using a unique identifier that is based on the features of the person in the bounding box, such as the person's facial features, clothing, etc. This unique identifier may be used to identify the same user as depicted in images acquired by any of the cameras in the conference room. For example, a first camera depicting a front view of the conference room may depict a first user that is facing forward. This first user would be identified and assigned a first ID. At a later time, the same person may turn towards the back of the conference room. A second camera with a field of view of the back of the conference room may acquire a still image of that user and re-identify them as the first user with the first ID. In another scenario, a first camera may depict a wide-angle view of the conference room depicting a second user that is assigned a second ID. A second camera with a narrower field-of-view may later acquire a still image of the conference room that includes the second user, which would be re-identified as the second user with the second ID.

A frame is then generated for each person, such that the frame is a portion of the person's face that is depicted in the respective bounding box. Each frame is associated with a corresponding person using their unique identifier. As an example, a frame for a person may be a cropped part of an acquired image that depicts the face of that person. A composite of all the frames is determined based on layout data and then sent to the far side via a network, where the far side includes a second endpoint device. The second endpoint device may display the layout of the frames to enable viewing of the participants of the videoconference.

When a person is first identified in an image, their identifier is generated and their tracking status is set to active based on their features and current location. Temporary movement within the conference room (for example, a person turning their back to the camera or a person moves and their image is captured by another camera), however, may result in preemptively removing their identifier from an identifier pool and/or changing their tracking status to inactive when such changes may not be permanent and thus warranted. In addition, any time a new person is detected, a new identifier is automatically generated and a new tracking status is assigned, both of which may be unnecessary if the new person has been previously assigned a unique identifier and tracked. These changes in the number of identifiers and/or the tracking status of participants may thus result in changes to framing that are unnecessary and unpleasant to the viewer.

Described in this disclosure are techniques for identifying participants and tracking their status in a manner that changes framing only when persistent changes to persons are detected. By minimizing the changes to framing, the system is able to provide a better far end experience. In order to capture temporary changes associated with the persons in a conference room, one or more timers or threshold of times may be defined. One timer or threshold of time may be used to define when changes are considered temporary vs. persistent. For example, if a change in persons is detected but reverts back to the original state prior to a threshold period of time expiring, no changes are made to the framing. By contrast, if the change in persons stays that way past the threshold period of time, the change is deemed persistent and the framing may be changed accordingly. The thresholds of time may be determined by retrieving predefined values of threshold of time, calculating the threshold of time, and so forth. For example, the thresholds of time may be retrieved from memory during use. In another example, the threshold of time may be calculated based on factors such as a number of persons depicted in the still images.

Illustrative System

Figure 1:
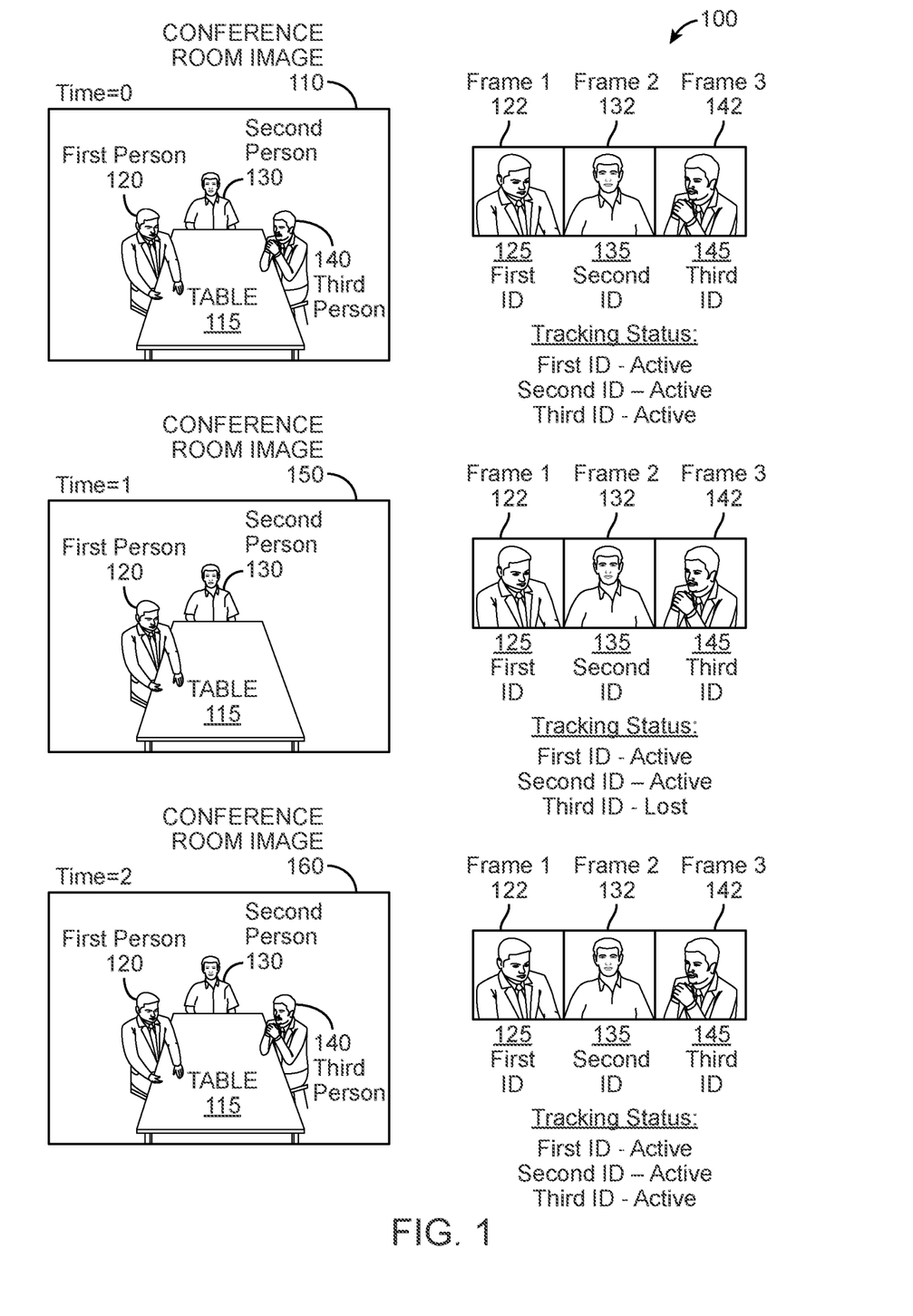
FIG. 1 illustrates a conference room image at three different times showing a temporary decrease in a number of persons detected, according to some implementations.

FIG. 1 depicts at 100 a conference room image acquired at three different times showing a temporary decrease in a number of persons detected. At a time=0, a conference room image 110 is acquired depicting a table 115 and 3 persons sitting around the table 115. The three persons are depicted as first person 120, second person 130, and third person 140. Time=0 could correlate to a time when a videoconference call is initiated, and the three persons are first detected.

The persons depicted in the conference room image 110 may be detected by analyzing the conference room image 110 using image processing techniques. For example, a video module of an endpoint device may utilize one or more classifiers, trained neural networks, and so forth to detect heads, faces, or bodies of persons depicted in the conference room image 110. In one embodiment, the head detector algorithm may output bounding boxes around the head or face of each person detected.

Once detected, an identifier for each person is determined. This identifier can be based on the bounding boxes that are detected around a user's body, head, or face. Characteristics or features of each person (such as facial features, clothing, etc.) may be used to determine a unique identifier for each person and the unique identifier may be associated with a current location. For example, the first person 120 may be assigned to first ID 125, the second person 130 may be assigned second ID 135, and the third person 140 may be assigned third ID 145. An identification pool may be used to keep track of the number of identifiers that have been assigned which corresponds to the number of total persons that have been detected during a videoconference.

A frame is also generated for each person. A frame represents a cropped portion or sub-section of conference room image 110 that depicts a face of a person. For example, three frames are generated for the persons detected in conference room image 110 to focus on the face of each user. These are illustrated as frame 1 122 corresponding to the first person 120, frame 2 132 corresponding to the second person 130, and frame 3 142 corresponding to the third person 140. A composite stream of these three frames may be generated and sent to a far end to view participants of a videoconference. A label may also be used for each frame to help distinguish the various persons, where each label may match the identifier that has been assigned to each person. As shown, first ID 125 is used as a label for the first person 120 in frame 1 122, second ID 135 is used as a label for the second person 130 in frame 2 132, and third ID 145 is used as a label for the third person 140 in frame 3 142.

A tracking status is also maintained for each person depicted in the conference room image 110. Given that the videoconference has been initialized and three persons have been detected, a tracking status of active is assigned to each of the three persons, as defined by the various identifiers defined for each person. As shown, the tracking status for the first ID 125, the second ID 135, and the third ID 145 is set to active.

At a time=1, a second conference room image 150 is acquired. The conference room image 150 depicts only two persons. At this time, a change in persons is detected from time=0 to time=1, where the change is due to a decrease in a number of detected persons. The number of persons may decrease due to a false negative (where a valid person has not been detected), a valid person has been occluded by another person and not detected, a person that has exited the conference room temporarily, or a person that has exited the conference room with no intention of returning. To account for possible temporary changes, no immediate changes are made to the identification pool or the tracking statuses.

Instead, a timer is defined to indicate a threshold of time that must be satisfied to consider these changes permanent. These timers may be predefined or dynamic. For example, one or more identification and/or tracking status timers may be predefined and set to a value or range of values. For example, the timers may be set to around 5 minutes or to a range between 1 minute and 10 minutes. In other embodiments, the timers may be adjusted dynamically based on the number of persons involved in a videoconference. Changes that are temporary may revert back within this time period, but those that do not are considered permanent. As shown, no changes are made to the framing of the three persons (even though only two persons are detected at time=1). Instead, the only change made at time=1 is to change the tracking status of the third person 140 with the third ID 145 from active to lost, but a subsequent change from lost to inactive is help in abeyance until the timers have been satisfied.

At a time=2, a third conference room image 160 is acquired. Time=2 is defined as a time that occurs after time=1 but before the elapsed time exceeds the one or more of the timers. Conference room image 160 again depicts the same three persons as seen at time=0. In this case, the change depicted at time=1 was only temporary as things reverted back to where they were at time=0. As can be seen the third person 140 is again depicted in conference room image 160, although their position or location has changed due to movement. By re-identifying the third person 140 with the third ID 145, a conclusion may be made that the set of persons depicted in conference room image 160 is the same as the set of persons depicted in conference room image 110 (despite movement). By doing so, the number of identifiers being used will not be reduced due to the temporary decrease in persons, nor will the number of identifiers be expanded due to the movement of the third person 140 to a different location. In addition, because the change was temporary and there were no changes to the number of identifiers being used, no changes are made to the framing of the three persons. This keeps the stream of frames stable without any changes from time=1 to time=2, thereby improving the overall viewing experience at the far end. The tracking status of the third person 140 may be set back to active to reflect the changes from time=1 to time=2.

Figure 2:
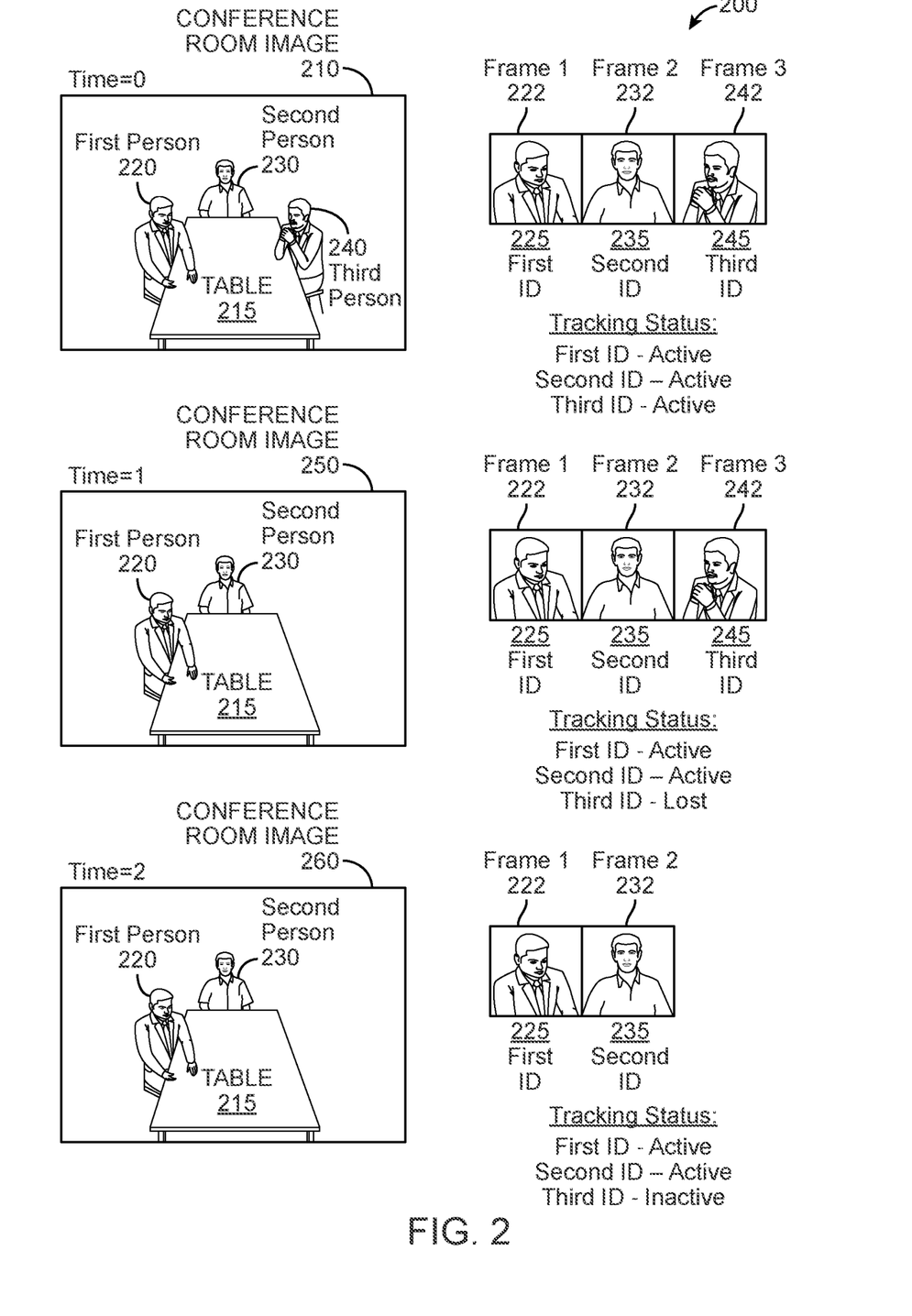
FIG. 2 illustrates a conference room image at three different times showing a permanent decrease in a number of persons detected, according to some implementations.

FIG. 2 depicts at 200 a conference room image acquired at three different times showing a permanent change in a decrease of persons. FIG. 2 shows a similar scenario to FIG. 1 at time=0 with 3 persons (first person 220, second person 230, and third person 240) detected around a table 215 in the conference room image 210. In addition, three frames are being used for the three persons, with frame 1 222 correlating to the first ID 225, frame 2 232 correlating to the second ID 235, and frame 3 242 correlating to the third ID 245. In addition, the tracking status of all three IDs indicates active tracking for all three IDs.

At a time=1, a similar change in persons is detected within conference room image 250, due to a decrease in a number of persons, with the third person 240 no longer being detected. To allow for temporary changes, the framing is maintained, but the tracking status of the third ID 245 is changed to lost.

By contrast, FIG. 2 illustrates a scenario where the elapsed time has already exceeded time=1 by more than the length of the one or more timers. At time=2, the changes are considered permanent and the framing and tracking statuses are changed accordingly. To account for a decrease in a number of persons detected, the composite stream of frames is updated to remove frame 3 242 that depicts the third person 240 with the third ID 245. The tracking status for the third person 240 is also updated to reflect that the third person 240 is not being actively tracked.

Figure 3:
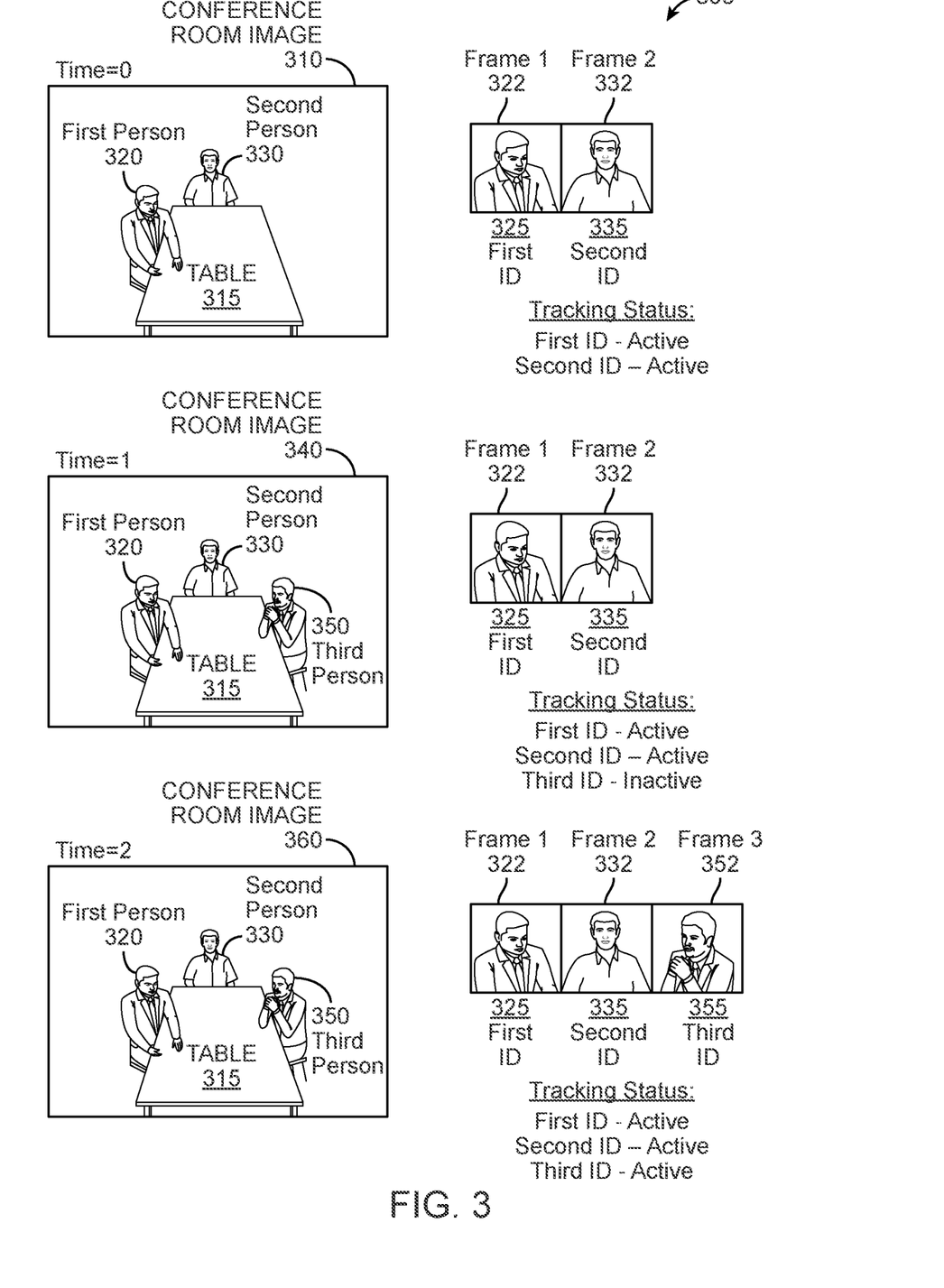
FIG. 3 illustrates a conference room image at three different times showing an increase in a number of persons detected with the new person having been previously tracked, according to some implementations.

FIG. 3 depicts at 300 a conference room image acquired at three different times showing an increase in a number of persons detected, where the new person has been previously tracked. At a time=0, a first conference room image 310 is acquired. Two persons (first person 320 and second person 330) are detected around a table 315 in the conference room image 310. Two frames are created with frame 1 322 correlating to the first person 320 with first ID 325 and frame 2 332 correlating to the second person 330 with second ID 335. The tracking status for both IDs is set to active.

At a time=1, a change in persons is detected within conference room image 340, due to an increase in a number of persons. At time=1, the third person 350 is newly detected as compared to time=0. Upon detecting someone new, tracking data is searched to see if the new person has been previously tracked. If the newly detected person has been previously tracked, an entry would be found to match the ID for that person with an inactive tracking status. As shown at time=1, a third ID is found to have an inactive tracking status. In some embodiments, a timer may be employed to determine if the new person that has been detected will be detected temporarily or if the new person will be detected past a threshold of time.

At a time=2 (once a threshold of time has been met), a new conference room image 360 is acquired once again depicting the same three persons as time=1. At this point, the third ID 355 may be retrieved due to having been previously tracked and re-assigned to the third person 350. The tracking status for the third ID 355 may also be changed from inactive to actively tracking. The framing established at time=0 may also be updated to add a new frame, frame 3 352, to correlate with the third person 350 identified by the third ID 355.

Figure 4:
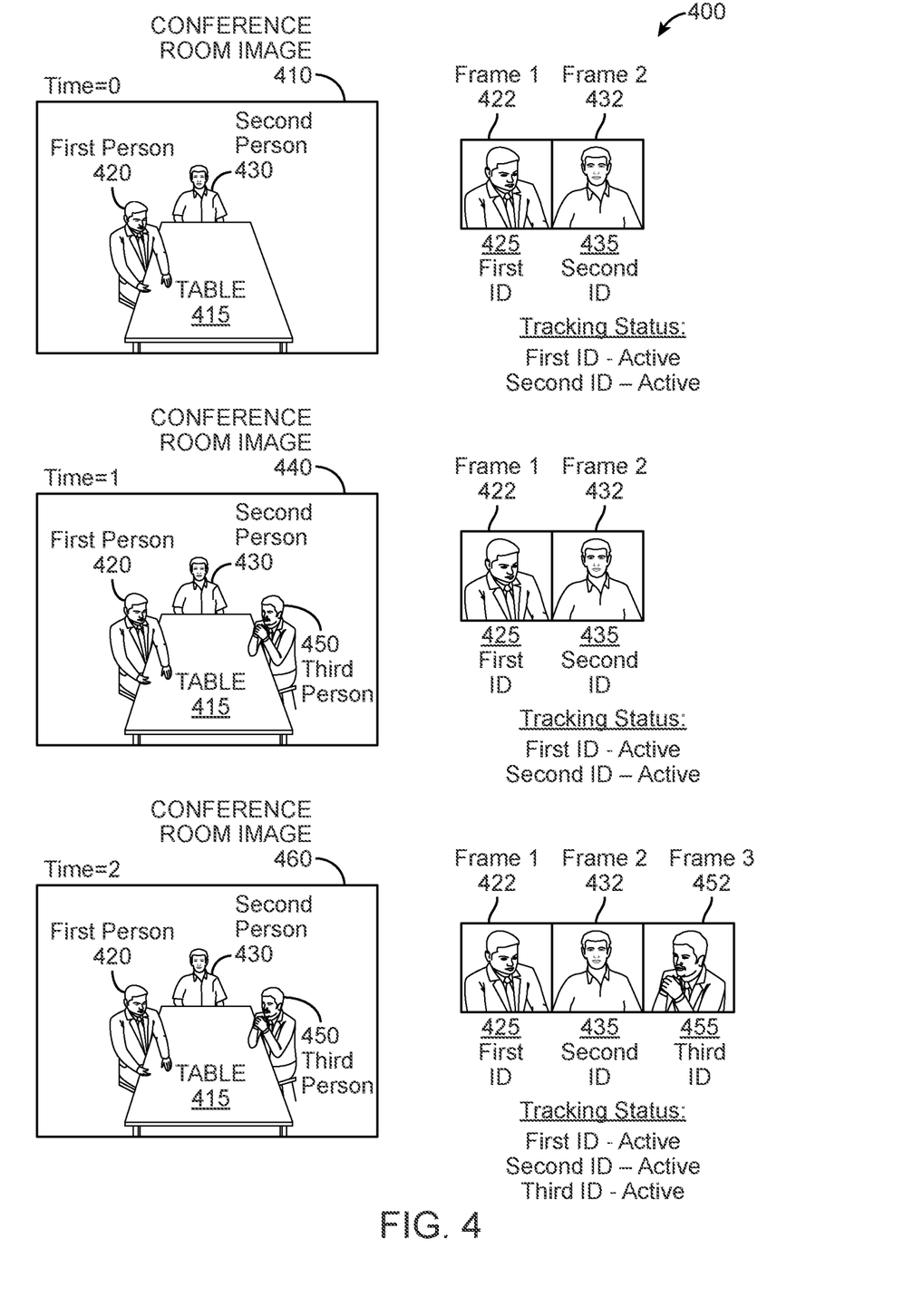
FIG. 4 illustrates a conference room image at three different times showing an increase in a number of persons detected with the new person not having been previously tracked, according to some implementations.

FIG. 4 depicts at 400 a conference room image acquired at three different times showing an increase in a number of persons detected, where the new person detected has not been previously tracked. FIG. 4 shows a similar scenario to FIG. 3 at a time=0 with 2 persons (first person 420 and second person 430) detected around a table 415 in the conference room image 410. Two frames are also being used, with frame 1 422 correlating to the first person 420 with the first ID 425 and frame 2 432 correlating to the second person 430 with the second ID 435. The tracking statuses of the two IDs are also set to active.

At a time=1, a change in persons is detected within conference room image 440, due to an increase in a number of persons, with the third person 450 being newly detected. The difference from FIG. 3 is that there is no entry for the third ID within the tracking data. Thus, the third person 450 is treated as a new person that requires the generation of a new identifier and the expansion of the identification pool. Once again, a timer may be used for deciding when the new person has persisted long enough to make the necessary framing and tracking status changes.

At a time=2 (a time when the elapsed time has already exceeded those timers), the same three persons are detected again. At this point, a new identifier is generated for the third person 450, shown as third ID 455. The framing is also updated to add a new frame for the third person 450, shown as frame 3 452 which correlates with third ID 455. The composite of frames is updated accordingly prior to sending to the far end. In addition, the third ID for the third person 450 will also be indicated as being actively tracked.

Figure 5:
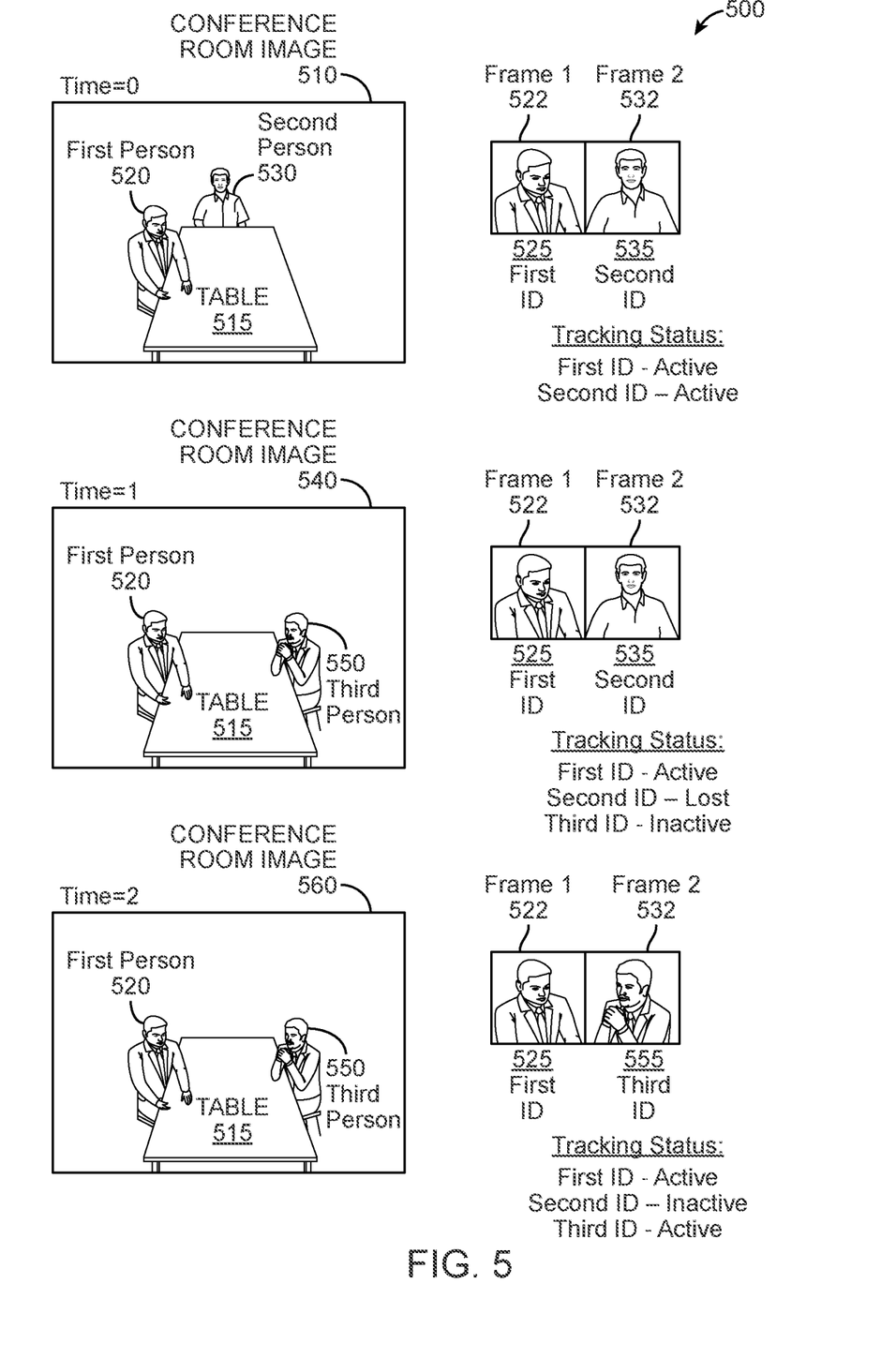
FIG. 5 illustrates a conference room image at three different times showing a change in the persons being tracked with the new person having been previously tracked, according to some implementations.

FIG. 5 depicts at 500 a conference room image acquired at three different times showing a change in persons detected. At time=0, a first conference room image 510 is acquired. Two persons (first person 520 and second person 530) are detected around a table 515 in conference room image 510. Two frames are created, with frame 1 522 correlating to the first person 520 with first ID 525 and frame 2 532 correlating to the second person 530 with second ID 535. The tracking status for both IDs is set to active.

At a time=1, a change in persons is detected within conference room image 540. This change may not be due to a different number of persons being detected, but instead due to a different set of persons being detected (e.g., the second person 530 is no longer detected, while the third person 550 is now detected). This scenario might be due to one person leaving a room, while a different person enters the room at substantially the same. In these scenarios, a search is likewise performed within the tracking data to determine if the different person that has now been detected has been previously tracked. If the person has been previously tracked, an entry would be found to match the ID for that person with an inactive tracking status. As shown at time=1, a third ID is found to have an inactive tracking status. A timer may be employed to determine if the different person detected at time=1 is temporary or will persist past a certain time period. In addition, the tracking status for the second person 530 is set to lost.

At a time=2 (once a threshold of time has been met), a new conference room image 560 is acquired depicting the same two persons. At this point, the third ID 555 is retrieved and re-assigned to the third person 550. The tracking status for the second ID 535 is changed from lost to inactive and the tracking status for the third ID is changed from inactive to active. The framing is also updated to remove frame 2 532 for the second ID 535 and add a frame 2 532 that correlates to the third ID 555 to the composite stream of frames.

Figure 6:
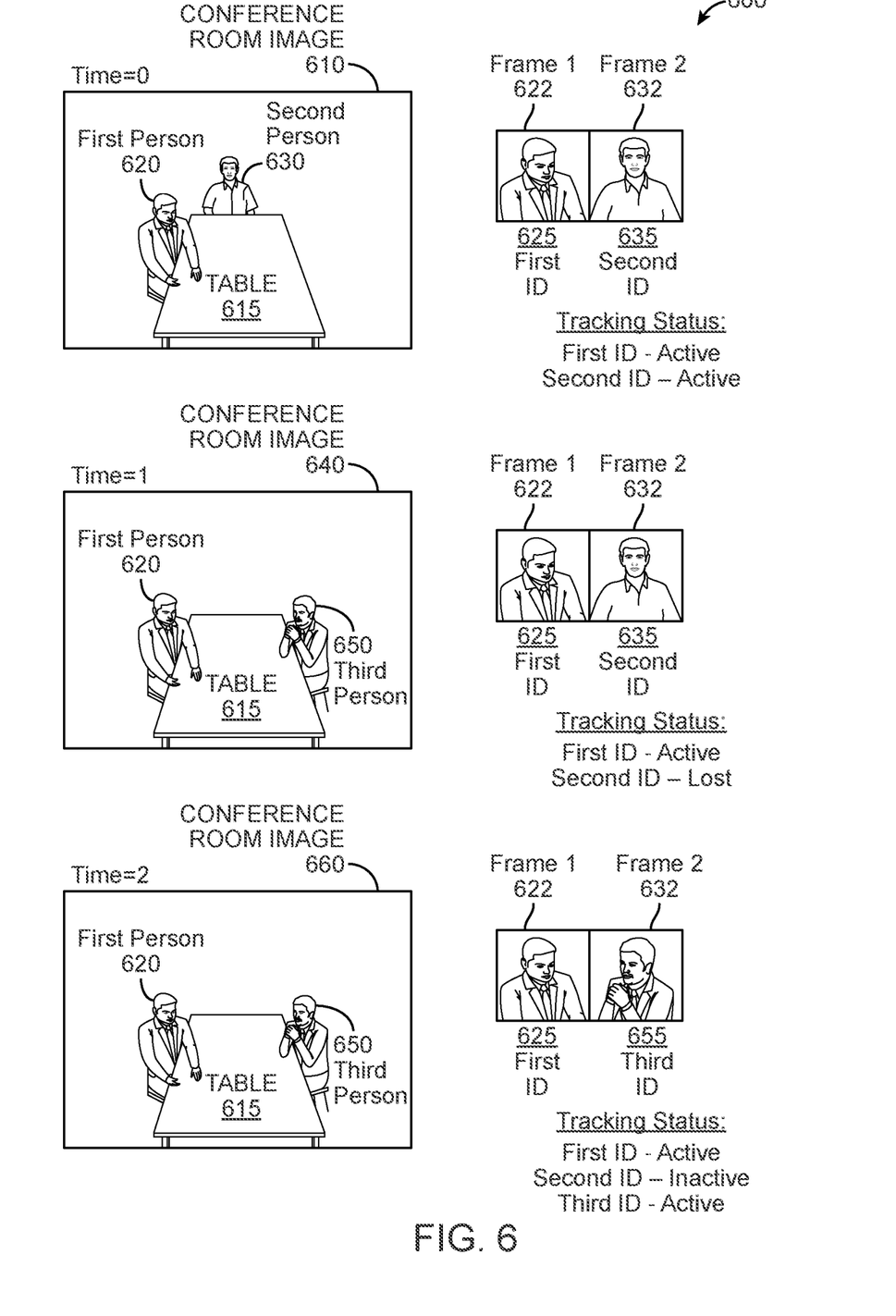
FIG. 6 illustrates a conference room image at three different times showing a change in the persons being tracked with the new person not having been previously tracked, according to some implementations.

FIG. 6 depicts at 600 a conference room image acquired at three different times showing a change in the persons detected, with the new person not having been previously tracked. Two persons are detected in the conference room image 610, particularly first person 620 and second person 630 sitting around a table 615. Two frames are used for the two persons, with frame 1 622 correlating to the first person 620 with the first ID 625 and frame 2 632 correlating to the second person 630 with the second ID 635. The tracking statuses of the two IDs are also set to active.

At a time=1, a change in persons is detected within conference room image 640, due to the second person 630 not being detected anymore, but the third person 650 being detected. The difference from the scenario in FIG. 5 is that there is no entry for the third ID in the tracking data. Accordingly, the third person 650 is treated as a new person that requires the generation of a new ID and the expansion of the identification pool. A timer may be used for deciding when the new person has persisted long enough to make the necessary changes to the identification pool, the framing, and the tracking data. The tracking status of the second ID 635 is changed from active to lost at time=1.

At a time=2 (a time when the elapsed time has already exceeded those timers), the same two persons are detected again in conference room image 660. At this point, a new identifier is generated for the third person 650, shown as third ID 655. Frame 2 632 for second ID 635 is replaced with frame 2 632 for third ID 655 in the composite stream of frames. The tracking status of the second ID is also changed from lost to inactive, while the tracking status of the third ID 655 is set to active.

Figure 7:
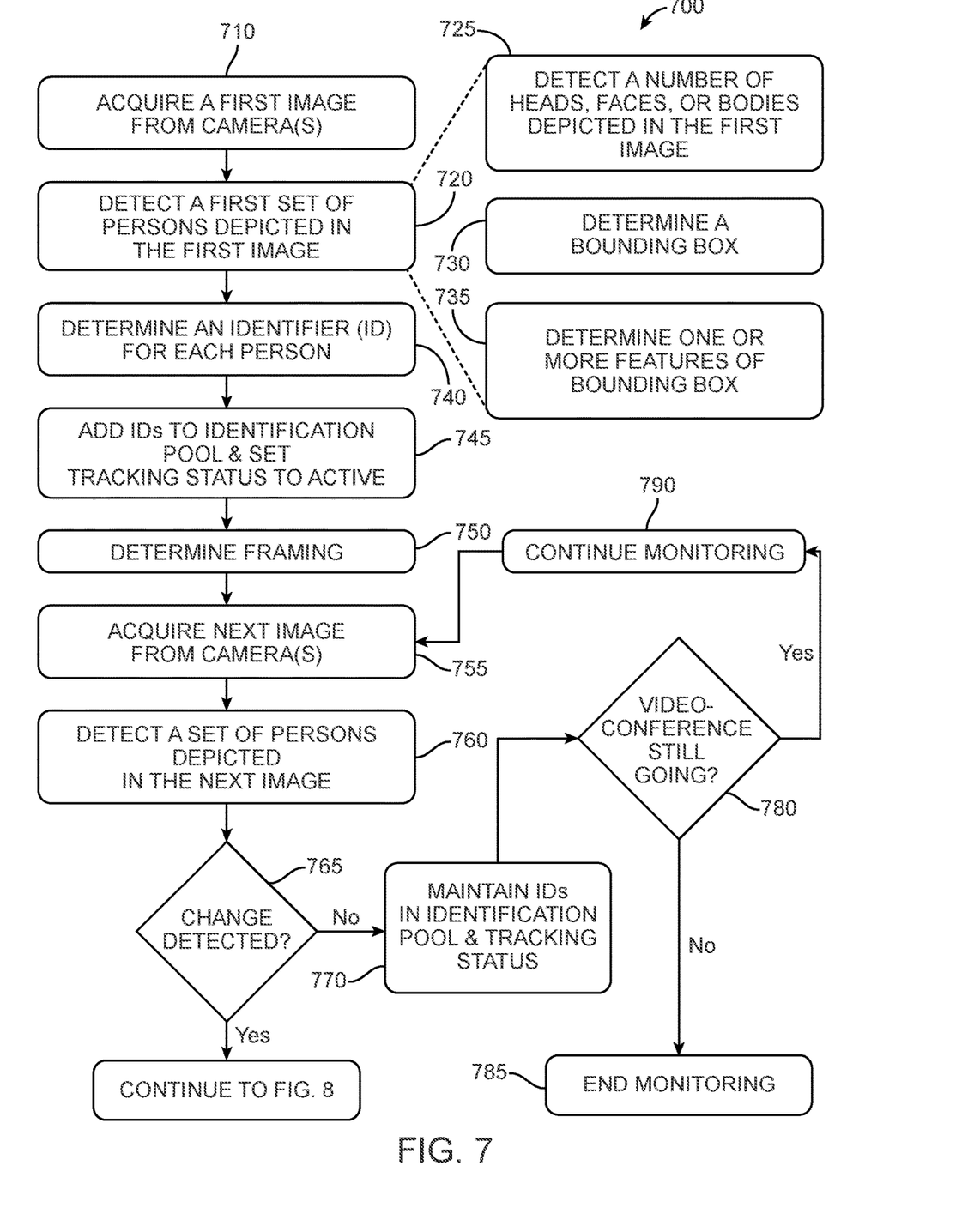
FIG. 7 & FIG. 8 illustrate a flow diagram of a process to detect changes in the persons depicted within images acquired during a videoconference, according to some implementations.
Figure 8:
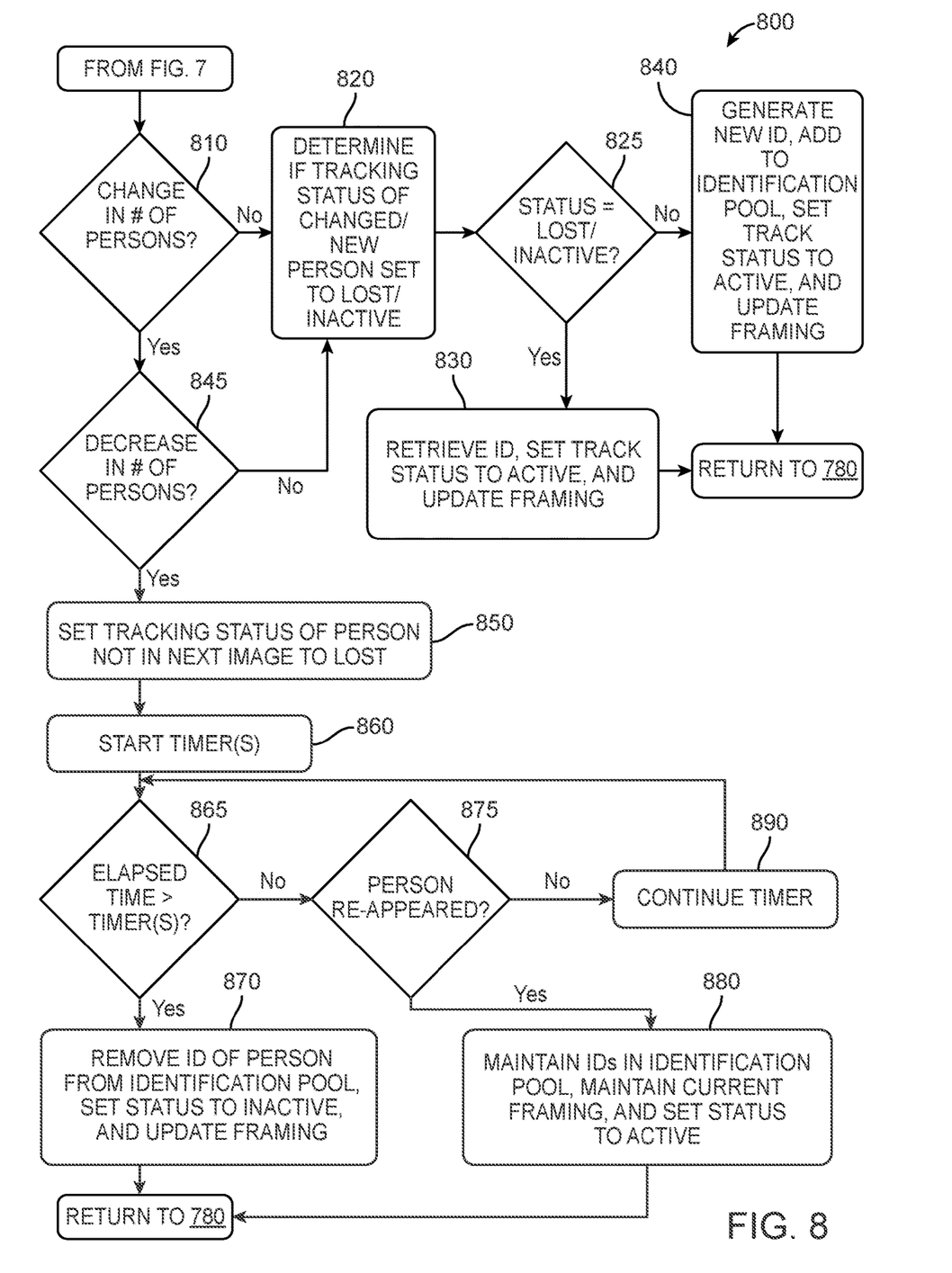

FIGS. 7-8 illustrates a process 700 and 800 to help detect changes in persons depicted in subsequent images and update framing data accordingly. At 710, a first image is acquired from a camera of the endpoint device. The image acquired at 710 may be acquired from a camera that is embedded within the endpoint device or external, but coupled, to the endpoint device. The image may represent a still image that is captured while a videoconference is being conducted. For example, the first image may be acquired when the videoconference is first initiated.

A first set of persons depicted in the first image are detected at 720. One possible way to detect the first set of persons is to follow steps 725-735. At 725, the first image may be processed via image recognition techniques to detect heads depicted in the image, faces depicted in the image, or bodies depicted in the image. At 730, a bounding box is determined for each person based on the heads, faces, or bodies detected at 725. For example, the bounding box may represent a region of interest associated with a person, such as a face of the person. At 735, one or more features of the bounding box may be determined. This may include identification data associated with the first image and the person, location data indicative of a location of the bounding box within the first image, and/or size data associated with a length and width of each bounding box.

At 740, an identifier is determined for each person depicted in the first image. This identifier may be unique to each person and may be based on features of the person and/or a number of identifiers that have been generated to date. For example, if the videoconference has just been initialized, and there have not been any identifiers generated yet, a first ID may be assigned to a first person and a second ID may be assigned to a second person. At 745, the identifiers that are determined at 740 are added to an identification pool. The identification pool has entries for each identifier that corresponds to each person detected during a videoconference. For example, if the first image depicts 3 persons, the identification pool would have a count of 3 entries, one for each person. In addition, a tracking status is set to active for each person depicted in the first image to indicate there are 3 persons being actively tracked.

At 750, framing is determined based on the first frame. A frame is generated for each of the persons detected in the first image, where the frame represents a cropped portion of the first image that focuses on a face of a person. The bounding box determined at 730 and the feature information associated therewith may be used to determine a region of interest for framing purposes. Once the frames have been generated, a composite stream of frames may be generated based on layout data. This layout data may be specific to capabilities of a sending or receiving endpoint device or a number of participants. Once generated, the composite stream of frames may be sent to the far end, where the far end may display the composite stream of frames to enable viewing of the participants of the videoconference.

At 755, a next image is be acquired from a camera. This may be the same camera or another camera with a field of view of the conference room and participants therein. At 760, the set of persons depicted in the next image is determined. At 765, a comparison of the first set of persons and the second set of persons is made to determine if a change is detected. A change in persons may be detected due to a number of reasons. For example, a number of persons detected may have increased or decreased. In other embodiments, the change may be due to different persons detected at a later time, even if the number of persons has not changed.

If no change is detected at 765, the process continues to step 770. The identifiers that are currently being used for the participants are maintained, the identification pool stays the same, and the tracking status of all participants is also maintained as active. At 780, a determination is made as to whether the video-conference is still going on. If the video-conference has ended, the process continues to 785, where monitoring of the conference room and its participants is ended. By contrast, if the video-conference has not ended, the process continues to 790, where monitoring of the videoconference participants continues and the next image is acquired at 755.

If a change is detected at 765, the process continues to FIG. 8. At 810, a determination is made as to whether the change detected is due to a change in a number of persons. If the number of persons has not changed, the process continues to step 820. This may occur, for example, when one person exited a conference room and another entered at nearly the same time. Although the total number of persons may not change, the persons participating in the videoconference are different.

At 820, the tracking status information is searched to determine if the changed/new person has being previously tracked by indicating a lost or inactive tracking status. If at 825, a decision is made that the changed/new person was previously tracked, the process continues to 830. At 830, the identifier pertaining to the changed/new person is retrieved and the tracking status for that changed/new person is set to active. In addition, the framing is updated by adding a frame for the changed/new person and removing the person that is no longer in the next frame (particularly if a timer has been satisfied). Thereafter, the process continues to 780 to determine if further monitoring is needed based on whether the videoconference is still going on.

By contrast, if at 825, a decision is made that the changed/new person was not previously tracked, then the process continues to 840. At 840, a new identifier is generated for the changed/new person and that identifier is added to the identification pool. In addition, the tracking status for the changed/new person is set to active. The framing is likewise updated to add a frame for the changed/new person and removing the frame for the person that is no longer in the next frame (particularly if a timer has been satisfied). The process continues to 780 to determine if further monitoring is needed based on whether the videoconference is still going on.

If the number of persons does change as determined at 810, the process continues to 845, where a further determination is made as to whether there has been a decrease in the number of persons detected. If there is no decrease, the process continues to 820 to deal with scenarios where the number of persons has increased instead. The total number of persons could have increased for a variety of reasons. There could be a false positive by the system or a new person could have entered the scene momentarily and may become a participant permanently. In the case of a new person, the system will determine if the new person is new or if the new person has been previously identified and tracked (e.g., via steps 820-840). This is another way to limit the expansion of the identification pool only for cases with new users that have not been previously tracked.

By contrast, if the number of persons is found to decrease at 845, the process continues to 850. The total number of persons could have decreased for a variety of reasons. There could have been a false negative, an occlusion where one person has been occluded by another persons, a person has exited the conference room temporarily, or a person has exited the conference room with no intention of re-appearing. In any of these scenarios, the tracking statuses may not be changed to inactive until a threshold period of time has been satisfied.

At 850, the tracking status for the person that is no longer detected in the next image is set to lost. Next, one or more timers may be started at 860. For example, a first timer may be used for changing an identification pool. A second timer may be used for changing a tracking status from lost to inactive or from inactive to active, etc. A timer is started from the time the next image is acquired. Thus, if a change is detected at a second time, then the elapsed time needs to exceed the second time by at least the length of the timer before any changes are made to the identification pool or the tracking statuses.

At 865, a determination is made as to whether the elapsed time has exceeded the length of the timer since the next image was acquired. If the elapsed time has exceeded the length of the timer since the next image was acquired, the process continues to 870. At 870, the identifier of the person that was not detected in the next image is removed from the identification pool. In addition, the tracking status of that person is changed from lost to inactive and the framing is updated by removing the frame associated with the missing person. Thereafter, the process continues to 780 to determine if further monitoring is needed based on whether the videoconference is still going on.

If the elapsed time has not exceeded the length of the timer since the next image was acquired, the process continues to 875, where a further determination is made as to whether the person that was not detected in the next image has re-appeared. If the person has not re-appeared, the process continues to 890, where the timer continues and the elapsed time is checked again at 865. If the person has re-appeared, the process continues to 880. This will capture temporary decreases that occur within the timer. In this case, at 880, the identifiers in the identification pool are maintained with no changes, the current framing is also maintained with no changes to the composite stream of frames, and the status of the person that re-appeared is changed back to active. Thereafter, the process continues to 780 to determine if further monitoring is needed based on whether the videoconference is still going on.

Figure 9:
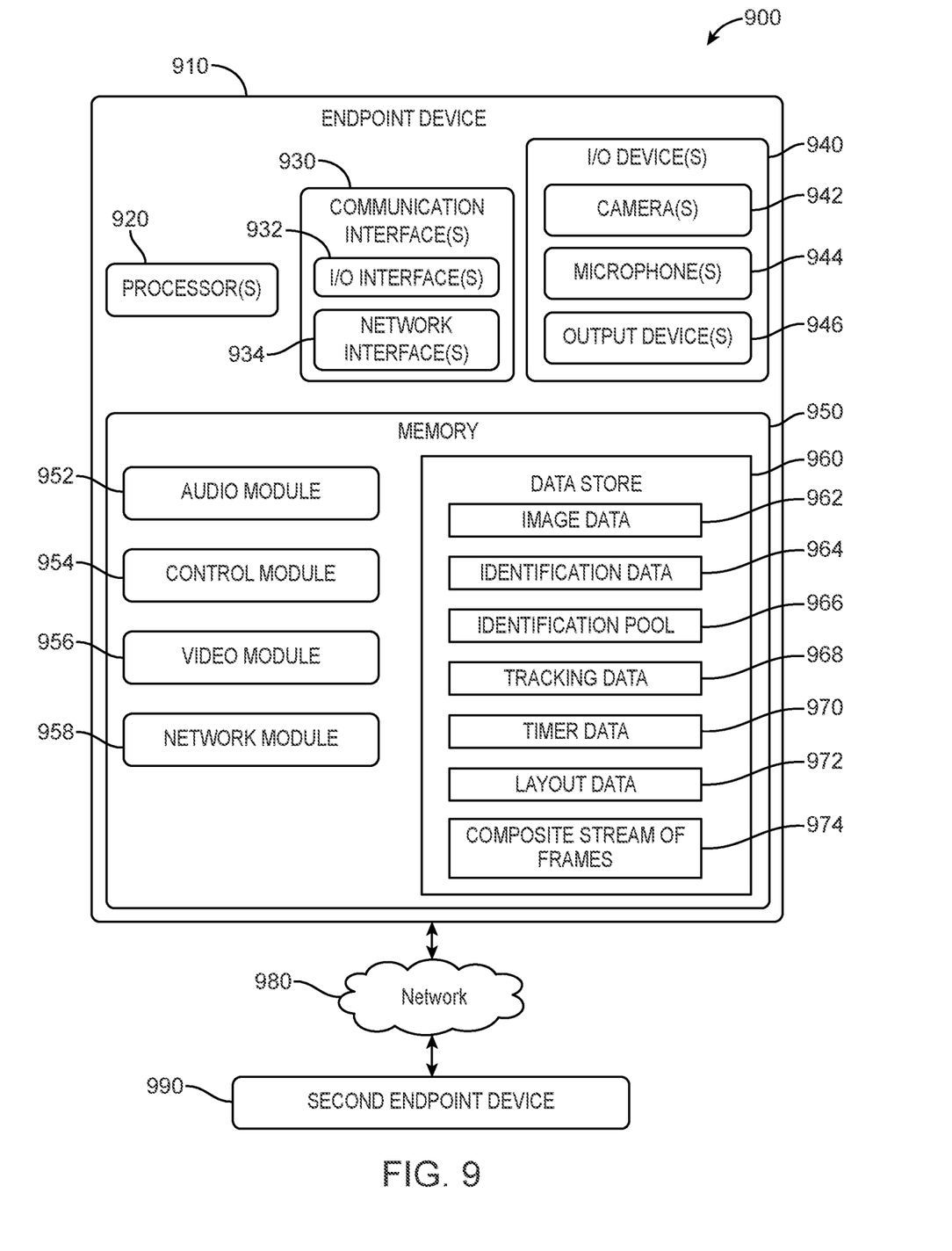
FIG. 9 illustrates a block diagram of an endpoint device to detect changes in the persons depicted within images acquired during a videoconference, according to some implementations.

FIG. 9 depicts at 900 a block diagram of an endpoint device 910 that performs the acquisition of image data, the generation of identification data associated with different persons, the maintaining of tracking data for the different persons, the definition/application of timer data, the framing, and the generation of streams of frames. The endpoint device 910 includes processor(s) 920 to help operate the various components of the endpoint device 910. For example, the processor(s) 920 may comprise a microcontroller, system on a chip (SoC), single board computer, and so forth. In one implementation, the processor(s) 920 may operate communication interfaces 930 and I/O devices 940. The processors 920 are configured to execute stored instructions.

The endpoint device 910 further includes the communication interface(s) 930 such as input/output (I/O) interfaces 932, network interfaces 934, and so forth. The communication interface(s) 930 enable the endpoint device 910, or components thereof, to communicate with other devices or components. The I/O interface(s) 932 may comprise Inter-Integrated Circuit (I2C), Serial Peripheral Interface bus (SPI), Universal Serial Bus (USB) as promulgated by the USB Implementers Forum, RS-232, and so forth. The network interface(s) 934 may be configured to provide communications between the endpoint device 910 and other endpoint devices, routers, access points, and so forth. The network interface(s) 934 may include devices configured to couple to personal area networks (PANS), local area networks (LANs), wireless local area networks (WLANS), wide area networks (WANs), and so forth. For example, the network interfaces 934 may include devices compatible with Ethernet, Wi-Fi, Bluetooth, ZigBee, and so forth.

The I/O interface(s) 932 may couple to one or more I/O device(s) 940. The I/O device(s) 940 may include devices such as camera(s) 942, microphone(s) 944, and so forth. The I/O device(s) 940 may also include output device(s) 946 such as one or more of a display device, printer, audio speakers, and so forth. In some embodiments, the I/O device(s) 946 may be physically incorporated with the endpoint device 910 or may be externally placed.

The camera(s) 942 are configured to generate image data 962, send the image data 962 to other components or devices, and so forth. The camera(s) 942 may include imaging sensors configured to acquire images of a scene, such as a conference room. In some embodiments, the camera(s) 942 include a plurality of cameras that are located throughout a conference room at various locations, each with a different field of view, angle, perspective, etc. For example, a first camera may acquire images with a wide-angle view of the whole conference room, while a second camera may acquire images of a central area of the conference room where a conference table may be located, while a third camera may acquire images from a left side of the conference room, while a fourth camera may acquire images from a right side of the conference room, and so on. These camera(s) 942 may be directly or indirectly coupled to endpoint device 910.

The I/O device(s) 946 also include microphone(s) 944. The microphone(s) 944 may be configured to acquire sound data indicative of sound present in an environment, such as a conference room. In some implementations, one or more arrays of microphones 944 may be used. Other output device(s) 946 may also be part of the endpoint device 910.

The endpoint device 910 also includes a memory 950 with various modules, including an audio module 952, a control module 954, a video module 956, and a network module 958. The memory 950 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 950 provides storage of computer-readable instructions, data structures, program modules, and other data for the operation of the endpoint device 910. A few example functional modules are shown stored in the memory 950, although the same functionality may alternatively be implemented in hardware, firmware, or as a system on a chip (SoC).

The audio module 952 performs audio processing for audio data acquired by the I/O devices 940, such as analyzing audio data for sound source localization. The control module 954 controls the various I/O devices 940, such as the cameras 942. For example, based on camera settings, the control module 954 may direct the movement of the cameras 942, such as a pan or tilt of the cameras 942.

The video module 956 performs various processing of images acquired by the cameras 942. Such analysis includes facial recognition techniques or object recognition techniques that help identify persons in a conference room. For example, the video module 956 may process image data 962 from the cameras 942 to detect faces, heads, or bodies of persons in a conference room. The video module 956 may also process the image data 962 to generate an identifier for each person in the conference room and save that as identification data 964. A running tally of the number of identifiers and persons in the conference room may be maintained by identification pool 966. For example, when a person is first detected in a conference room, a new identifier is created and designated for that person. Movement of that same user, however, would not trigger creation of a new identifier and thus a count of the identifiers in the identification pool 966 would be maintained.

The network module 958 outputs audio and video data to a remote endpoint device via a network 980. The network module 958 also receives audio data and video data via the network 980 and sends that to the audio module 952 and/or the video module 956 for processing.

Also stored in the memory 950 may be a data store 960. The data store 960 may use a flat file, database, linked list, tree, executable code, script, or other data structure to store information. In some implementations, the data store 960 or a portion of the data store 960 may be distributed across one or more other devices. As shown, the data store 960 may store image data 962 that is acquired by the camera(s) 942. The data store 960 also stores identification data 964 and identification pool 966. Identification data 964 comprises a unique identifier that is generated for each different person. This identifier may be generated based on one or more features of the person, such as features of their face, head, body, etc. These features may be any characteristic of the person that may be distinctly characterized within a still image.

The identification pool 966 comprises a table structure or list that tracks the total number of persons depicted in a conference room. For example, a number of entries within identification pool 966 matches the number of persons participating in a videoconference. Entries in the identification pool 966 are not removed until a user becomes inactive for a period of time.

Data store 960 also stores tracking data 968. Tracking status data may be represented by using a table structure or the like to indicate a current tracking status for a person. For example, tracking data 968 may indicate if a particular person is actively being tracked, if tracking for a person has been temporarily lost, or if that person is inactive and thus not being tracked.

The data store 960 also stores timer data 970. Timer data 970 defines one or more timers to be used to help differentiate between changes in persons that are deemed temporary and those that have become permanent. A first timer may be defined for when an entry in identification pool 966 is to be added or removed. Another timer may also be defined for when the status of a person should be changed from active to lost to inactive or vice versa.

Data store 960 also stores layout data 972. Layout data 972 may indicate rules and/or preferences for displaying frames. The composite stream of frames 974 is a resulting composite of all frames for all participating persons according to the preferences defined by layout data 972.

A second endpoint device 990 may be connected to the endpoint device 910 via the network 980. The second endpoint device 990 may send and receive audio data and/or image data 962 during a videoconference.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program may be configured to access, including signals transferred by one or more networks. For example, the transitory machine-readable signal may comprise transmission of software by the Internet.

Separate instances of these programs may be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above may be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a first endpoint device (910) comprising:
      one or more cameras (942);
      a first memory (950) storing first computer-executable instructions; and
      a first hardware processor (920) coupled to the one or more cameras (942) and the first memory (950), the first hardware processor (920) configured to execute the first computer-executable instructions to:
         acquire, at a first time, a first image from the one or more cameras (710);
         determine a first set of persons depicted in the first image (720);
         determine an identifier associated with each person in the first set of persons (740);
         add the identifier associated with the each person in the first set of persons to an identification pool (745);
         acquire, at a second time, a second image from the one or more cameras (755);
         determine a second set of persons depicted in the second image (760);
         detect a change between the first set of persons depicted in the first image and the second set of persons depicted in the second image (765);
         determine a first threshold of time (860); and
         maintain an identifier of a person associated with the change in the identification pool at least until an elapsed time since the second time exceeds the first threshold of time (865, 870, 880).

2. The system of claim 1, the first computer-executable instructions to determine the first set of persons depicted in the first image further comprise instructions to:
   determine a bounding box associated with at least a portion of the each person in the first set of persons (725, 730), wherein the at least a portion of the each person comprises a head, a face, or a body;
   determine one or more features associated with each bounding box (735); and
   use the one or more features to determine the identifiers associated with the each person in the first set of persons (740).

3. The system of claim 1, the first hardware processor to further execute the first computer-executable instructions to:
   determine the change between the first set of persons depicted in the first image and the second set of persons depicted in the second image comprises a decrease in a total number of persons detected from the first time to the second time (845);
   determine an identifier associated with a person detected in the first image but not detected in the second image (870); and
   remove the identifier associated with the person detected in the first image but not detected in the second image from the identification pool when a difference between the second time and the first time exceeds the first threshold of time (870).

4. The system of claim 3, the first hardware processor to further execute the first computer-executable instructions to:
   at the second time, set a tracking status associated with the person detected in the first image but not detected in the second image as lost (850);
   determine a second threshold of time (860);
   determine the elapsed time since the second time exceeds the second threshold of time (865); and
   set the tracking status associated with the person detected in the first image but not detected in the second image as inactive (870).

5. The system of claim 3, the first hardware processor to further execute the first computer-executable instructions to:
   determine a first frame for the each person in the first set of persons, wherein the first frame for the each person in the first set of persons comprises a portion of the first image that depicts a face of that person (750);
   determine a first layout of the first frames (750); and
   after the elapsed time since the second time exceeds the first threshold of time, remove the first frame associated with the person detected in the first image but not detected in the second image from the first layout (870).

6. The system of claim 1, the first hardware processor to further execute the first computer-executable instructions to:
   determine the change between the first set of persons in the first image and the second set of persons in the second image comprises a decrease in a number of persons detected from the first time to the second time (845);
   acquire, at a third time before the elapsed time since the second time exceeds the first threshold of time, a third image from the one or more cameras (875);
   determine a third set of persons depicted in the third image (875);
   determine the first set of persons depicted in the first image is the same as the third set of persons depicted in the third image (875);
   maintain the identifiers in the identification pool at the third time (880); and
   maintain a layout of frames associated with the each person in the first set of persons from the first time to the third time (880).

7. The system of claim 6, the first hardware processor to further execute the first computer-executable instructions to:
   set, at the second time, a tracking status associated with a person detected in the first image but not detected in the second image as lost (850);
   determine a second threshold of time (860);

determine that the person that was detected in the first image but not detected in the second image is again detected in the third image, prior to the elapsed time since the second time exceeding the second threshold of time (875); and set the tracking status associated with the person that was detected in first image but not detected in the second image and again detected in the third image as active (880).

8. The system of claim 1, wherein the first threshold of time is between 1 minute and 10 minutes (860).

9. The system of claim 1, the first hardware processor to further execute the first computer-executable instructions to:
determine the change between the first set of persons depicted in the first image and the second set of persons depicted in the second image comprises an increase in a total number of persons detected from the first time to the second time (845);
determine a tracking status associated with a person that was not detected in the first image but was detected in the second image was previously set to lost or inactive (820, 825);
retrieve an identifier associated with the person that was not detected in the first image but was detected in the second image (830); and
set the tracking status associated with the person that was not detected in the first image but was detected in the second image as active (830).

10. The system of claim 1, the first hardware processor to further execute the first computer-executable instructions to:
determine the change between the first set of persons depicted in the first image and the second set of persons depicted in the second image comprises an increase in a number of persons detected from the first time to the second time (845, 820);
determine a tracking status associated with a person not detected in the first image but detected in the second image was not previously set to lost or inactive (825);
generate an identifier for the person not detected in the first image but detected in the second image (840);
add the identifier for the person not detected in the first image but detected in the second image to the identification pool (840); and
set the tracking status associated with the person not detected in the first image but detected in the second image as active (840).

11. The system of claim 1, the first hardware processor to further execute the first computer-executable instructions to:
determine the change between the first set of persons depicted in the first image and the second set of persons depicted in the second image comprises a change in persons being tracked (810);
determine if a tracking status set to inactive matches any of the persons depicted in the second image (820, 825);
if a match exists, retrieve an identifier associated with that person and change the track status for that person to active (830); and
if no match exists, generate a new identifier associated with that person, add the new identifier to the identification pool, and set a tracking status for that person to active (840).

12. A method comprising:
acquiring, at a first time, a first image from one or more cameras of an endpoint device (710);
determining a first set of persons depicted in the first image (720);
determining an identifier associated with each person in the first set of persons (740);
adding, to an identification pool, the identifier associated with the each person in the first set of persons (740);
acquiring, at a second time, a second image from the one or more cameras (755);
determining a second set of persons depicted in the second image (760);
detecting a change between the first set of persons depicted in the first image and the second set of persons depicted in the second image (765); and
maintaining an identifier of a person associated with the change in the identification pool at least until an elapsed time since the second time exceeds a first threshold of time (865, 870, 880).

13. The method of claim 12, further comprising:
determining the change between the first set of persons depicted in the first image and the second set of persons depicted in the second image comprises a decrease in a total number of persons detected from the first time to the second time (845);
determining an identifier associated with a person detected in the first image but not detected in the second image (870); and
removing the identifier associated with the person detected in the first image but not detected in the second image from the identification pool when a difference between the second time and the first time exceeds the first threshold of time (870).

14. The method of claim 12, further comprising:
determining the change between the first set of persons in the first image and the second set of persons in the second image comprises a decrease in a number of persons detected from the first time to the second time (845);
acquiring, at a third time before the elapsed time since the second time exceeds the first threshold of time, a third image from the one or more cameras (875);
determining a third set of persons depicted in the third image (875);
determining the first set of persons depicted in the first image is the same as the third set of persons depicted in the third image (875); and
maintaining the identifiers in the identification pool from the first time to the second time to the third time (880).

15. The method of claim 12, further comprising:
determining the change between the first set of persons depicted in the first image and the second set of persons depicted in the second image comprises an increase in a total number of persons detected from the first time to the second time (845);
determining whether a tracking status associated with a person that was not detected in the first image but detected in the second image was previously set to lost or inactive (820, 825);
if the tracking status associated with the person that was not detected in the first image but was detected in the second image was previously set to lost or inactive, retrieving an identifier associated with that person and setting a tracking status associated with that person as active (830); and
if the tracking status associated with the person that was not detected in the first image but was detected in the second image was not previously set to lost or inactive, generating an identifier for that person, adding the identifier for that person to the identification pool, and setting the tracking status associated with that person to active (840).

16. The method of claim 12, further comprising:

determining the change between the first set of persons depicted in the first image and the second set of persons depicted in the second image comprises a change in persons being tracked (810);

determining if a tracking status set to lost or inactive matches any of the persons depicted in the second image (820, 825);

if a match exists, retrieving an identifier associated with that person and changing the track status for that person to active (830); and if no match exists, generating a new identifier associated with that person, adding the new identifier to the identification pool, and setting the track status for that person to active (840).

17. A system comprising:

a first endpoint device (910) comprising:
  one or more cameras (942);
  a first memory (950) storing first computer-executable instructions; and
  a first hardware processor (920) coupled to the one or more cameras (942) and the first memory (950), the first hardware processor (920) configured to execute the first computer-executable instructions to:
    acquire, at a first time, a first image from the one or more cameras (710);
    determine a first set of persons depicted in the first image (720);
    determine an identifier associated with each person in the first set of persons (740);
    add the identifiers associated with the each person in the first set of persons to an identification pool (745);
    set a tracking status for the each person in the first set of persons to active (745);
    acquire, at a second time, a second image from the one or more cameras (755);
    determine a second set of persons depicted in the second image (760);
    detect a change between the first set of persons depicted in the first image and the second set of persons depicted in the second image (765); and
    maintain an identifier of a person associated with the change in the identification pool for a duration of time after the change is detected (865, 870, 880).

18. The system of claim 17, the first hardware processor to further execute the first computer-executable instructions to:

determine the change between the first set of persons depicted in the first image and the second set of persons depicted in the second image comprises a decrease in a total number of persons detected from the first time to the second time (845);

set the tracking status associated with a person detected in the first image but not detected in the second image as lost (850);

determine an identifier associated with the person detected in the first image but not detected in the second image (870);

remove the identifier associated with the person detected in the first image but not detected in the second image from the identification pool when a difference between the second time and the first time exceeds a first threshold of time (870); and set the tracking status associated with the person detected in the first image but not detected in the second image as inactive when the difference between the second time and the first time exceeds the first threshold of time (870).

19. The system of claim 17, the first hardware processor to further execute the first computer-executable instructions to:

determine the change between the first set of persons in the first image and the second set of persons in the second image comprises a decrease in a number of persons detected from the first time to the second time (845);

acquire, at a third time before an elapsed time since the second time exceeds a first threshold of time, a third image from the one or more cameras (875);

determine a third set of persons depicted in the third image (875);

determine the first set of persons depicted in the first image is the same as the third set of persons depicted in the third image (875); and maintain the identifiers in the identification pool from the first time to the second time to the third time (880).

20. The system of claim 17, the first hardware processor to further execute the first computer-executable instructions to:

determine the change between the first set of persons depicted in the first image and the second set of persons depicted in the second image comprises an increase in a total number of persons detected from the first time to the second time (845);

determine whether a tracking status associated with a person that was not detected in the first image but was detected in the second image was previously set to lost or inactive (820, 825);

if the tracking status associated with the person that was not detected in the first image but was detected in the second image was previously set to lost or inactive, retrieve an identifier associated with that person and set the tracking status associated with that person as active (830); and if the tracking status associated with the person that was not detected in the first image but was detected in the second image was not previously set to lost or inactive, generate an identifier for that person, add the identifier for that person to the identification pool, and set the tracking status associated with that person to active (840).

\* \* \* \* \*